United States Patent [19]

Cardot et al.

[11] 4,134,138

[45] Jan. 9, 1979

[54] METHOD OF READING ADDRESSES ON A MAGNETIC RECORDING MEDIUM AND APPARATUS FOR PUTTING IT INTO EFFECT

[75] Inventors: Claude R. Cardot; Jacques P. Droux, both of Paris; André J. Oisel, Elancourt, all of France

[73] Assignee: Compagnie Internationale pour l'Informatique Cii Honeywell Bull, Paris, France

[21] Appl. No.: 765,057

[22] Filed: Feb. 2, 1977

[30] Foreign Application Priority Data

Sep. 20, 1976 [FR] France .................................. 76 28169

[51] Int. Cl.² .............................................. G11B 5/09
[52] U.S. Cl. ......................................... 360/39; 360/48
[58] Field of Search ...................... 360/48, 49, 51, 39

[56] References Cited

U.S. PATENT DOCUMENTS

| | | | |
|---|---|---|---|
| 3,281,806 | 10/1966 | Lawrance et al. | 360/48 |
| 3,479,664 | 11/1969 | Williams et al. | 360/48 |
| 3,656,130 | 4/1972 | Bucklin, Jr. et al. | 360/48 |

*Primary Examiner*—Vincent P. Canney
*Attorney, Agent, or Firm*—Lowe, King, Price & Becker

[57] ABSTRACT

Items of information written in a binary code on a plurality of magnetic disc tracks are read by a magnetic head. The address for each track is written in a reference zone having a plurality of cells equal to the number of bits in the address. A constant frequency cyclic reference signal H is divided by logic pulses from the head to produce a signal SYNCHRO. The bit of each address is determined by combining the SYNCHRO signals and a pulse representative of the binary value of each bit that depends on the temporal position of a pulse within a period of signal SYNCHRO. The number of cells is counted, each time a bit is determined. The address is sampled bit by bit and transferred to a storage member throughout the counting and sampling operations.

8 Claims, 9 Drawing Figures

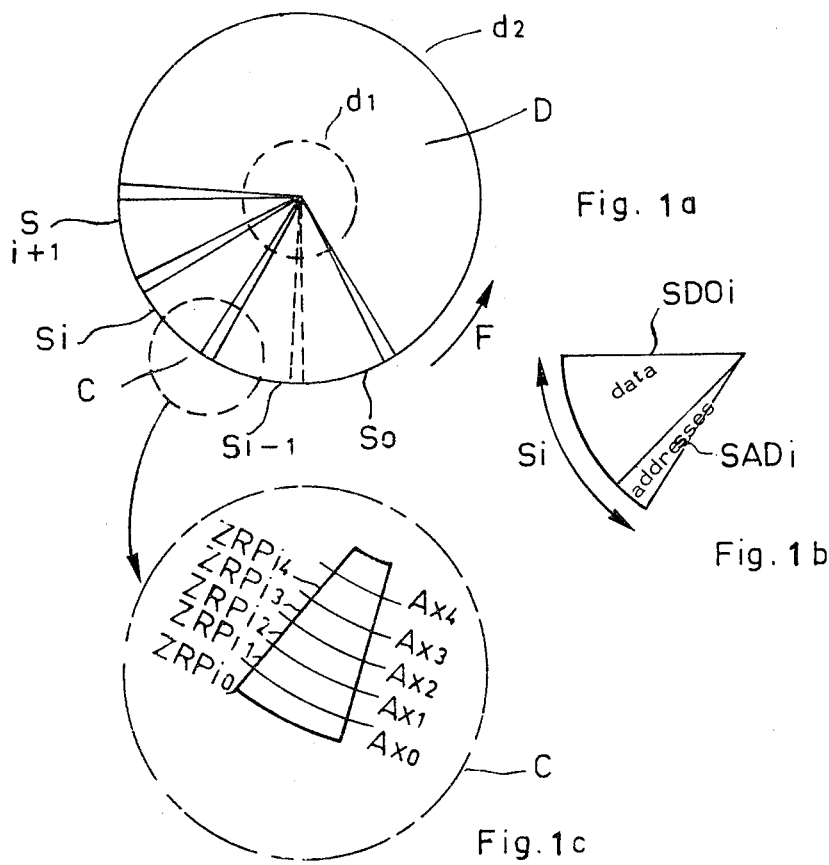
Fig. 1a
Fig. 1b
Fig. 1c
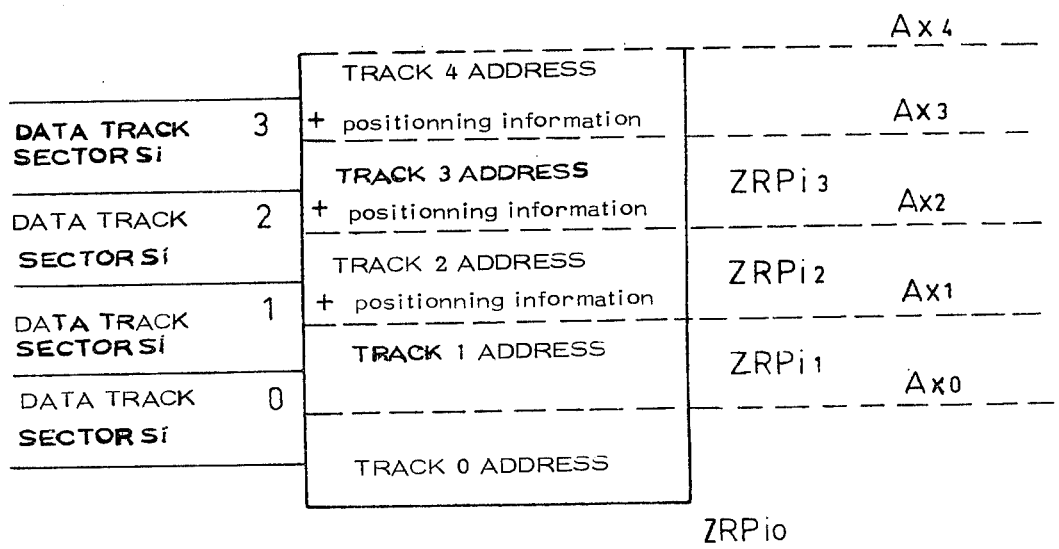
Fig. 1d

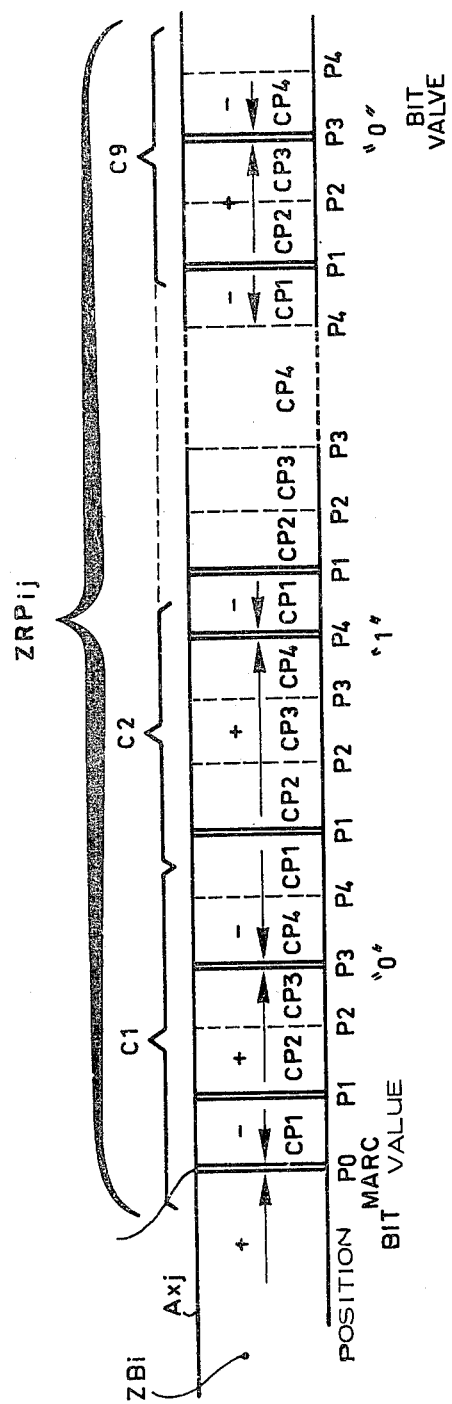
FIG:2

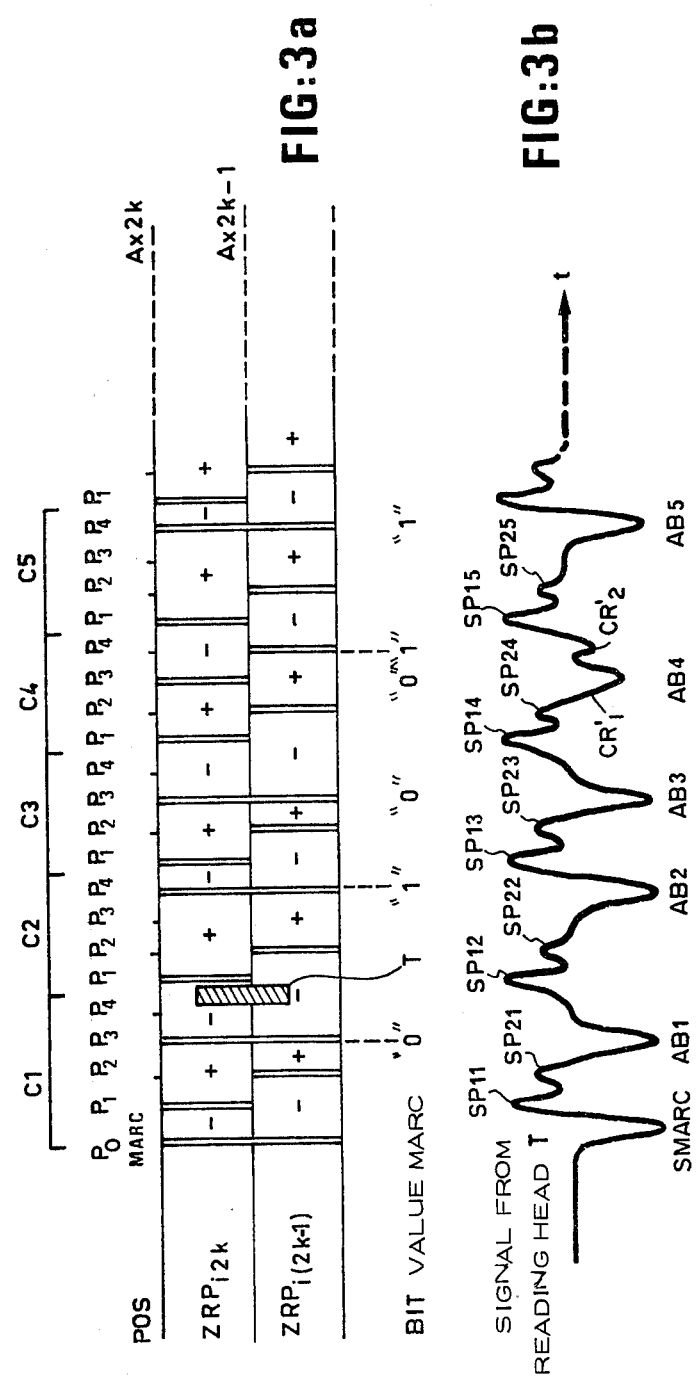

METHOD OF READING ADDRESSES ON A MAGNETIC RECORDING MEDIUM AND APPARATUS FOR PUTTING IT INTO EFFECT

BACKGROUND OF THE INVENTION

The present invention relates to a method of reading on a magnetic recording medium and to apparatus for carrying out the method. It is more particularly applicable to magnetic disc memories.

In present day data-processing systems use is being more frequently made of magnetic disc memories, because of their storage capacity and the relatively short time required for the magnetic read/write heads to access information situated anywhere on the discs from the moment an instruction to access this information is received from the processing system.

It is known that magnetic discs carry information in coded form on concentric circular recording tracks whose width does not exceed a few hundredths of a millimeter and which are formed on both faces of the discs. The tracks are identified by allotting them a serial number j (j being a whole number) between 0 and (N−1), N being the total number of recording tracks. A coded expression of the serial number j of a track is called an address. The codes most frequently used are binary codes.

It is known that, for small storage capacity memories, which contain only one or two discs, the track addresses on one face of a disc are recorded on this same face in such a way that a maximum amount of disc space is set aside for recording data from the data processor and a minimum amount of space is set aside for address recording and for recording information required to servo-control the the magnetic head associated with the face in question to the contact track position.

In present practice, the addresses and the information for servo-controlling the head position are recorded sets of reference zones which are distributed over the entire surface of the disc. The number of zones is at least equal to the number of tracks, with each set of zones including indexing indicia which enable the beginning of the set to be found.

Each reference zone includes a predetermined number of cells, each of which contains an item of information for servo-controlling position and one bit of the address, as is described in the commonly assigned U.S. Pat. application Ser. No. 765,058 entitled "Method of Writing Addresses on a Magnetic Recording Medium", filed Feb. 2, 1977. The number of cells in a zone is equal to the number of address bits.

It will be recalled that the word "bit" refers both to a binary digit, 1 or 0, and to any way of expressing a binary digit either on a magnetic record, as an analogue single or an electric logic signal; a binary analogue signal is defined as a signal voltage that varies between a value (+V) and a value (−V), whereas a logic signal can assume only two values, known as "logic zero" and "logic one".

In the prior art, to record a succession of information items on a magnetic medium, each track of the medium includes a succession of small magnetic domains termed "elementary magnetic areas." These areas are distributed along the entire length of the track. The magnetism induced in successive areas is of opposing value, sense or polarity, and is orientated in a direction parallel to the disc surface. Each cell for positioning information and one address bit includes two magnetization changes. Each of these changes may occupy one of two predetermined positions within the cell. The first change constitutes the positioning information, while the second change, termed an "adjusting change," indicates the address bit value, as determined by the position occupied by the change. When a magnetic head encounters a series of magnetization sense changes representing a reference zone, it emits a series of analogue signals which are formed into a succession of logic pulses by shaping circuits. The beginning of the reference zone is indicated by a special pulse.

If the logic pulses representing the adjusting changes are considered, each change may occupy two positions. The time interval separating each adjusting change pulse from a pulse occurring at the beginning of the reference zone differs, depending on the value of the address bit.

An object of the invention is to provide a method of reading addresses on a recording medium by finding the time position of each logic pulse in relation to the pulse indicating the beginning of the zone and storing the address bits as binary logic zero or one binary signals.

This is achieved by frequency dividing a first signal of constant frequency termed the "reference signal to form", a second signal which is synchronised by the logic pulses. The value of each address bit is obtained by finding the temporal position of each of the logic pulses within each period of the second signal.

SUMMARY OF THE INVENTION

The present invention relates to a simple and reliable method of reading addresses on a magnetic recording medium, which method can be performed by inexpensive apparatus.

The method of the invention is performed in connection with a magnetic recording medium where the information items are carried by a plurality of tracks and written in a binary code by at least one magnetic head. The track addresses are written sets of reference zones, so each track is associated with at least one zone. Each set of zones contains indexing indicia that allow the beginning of the set to be found. Each zone comprises a plurality of individual cells, equal in number to the bits of the address which contain at least one change of magnetization sense. The change of magnetization polarity occupies one of two predetermined positions within the cell, to position indicate the value of each address bit. The signals read by the head are shaped into logic pulses. The method is characterized by:

(1) generating a cyclic reference signal H of very constant frequency;
(2) deriving a signal SYNCHRO by dividing the frequency of signal H in synchronism with logic pulses $IMP_i$;
(3) deriving each address bit by combining the SYNCHRO signal and the logic pulses $IMP_i$ and then storing the derived address bit; the value of each address bit depends on the temporal position of the pulse $IMP_i$ within a period of signal SYNCHRO:
(4) counting the number of cells so one cell is counted each time a bit is stored; and
(5) sampling and then storing the address.

The address is sampled and cells are counted during the entire time taken to read each zone.

BRIEF DESCRIPTION OF THE DRAWINGS

The invention will be better understood from the following description, given with reference to the accompanying drawings, which illustrate an embodiment of the invention by way of example.

In the drawings:

FIGS. 1a to 1d are illustrations of a preferred way of distributing information over the surface of a magnetic disc;

FIG. 2 is an illustration of a positioning reference zone in which the address is written in a reflected binary or Gray code;

FIGS. 3a and 3b are illustrations of waveforms of the analogue signals resulting from the magnetic head reading the addresses;

DESCRIPTION OF THE PREFERRED EMBODIMENT

Figure 4:
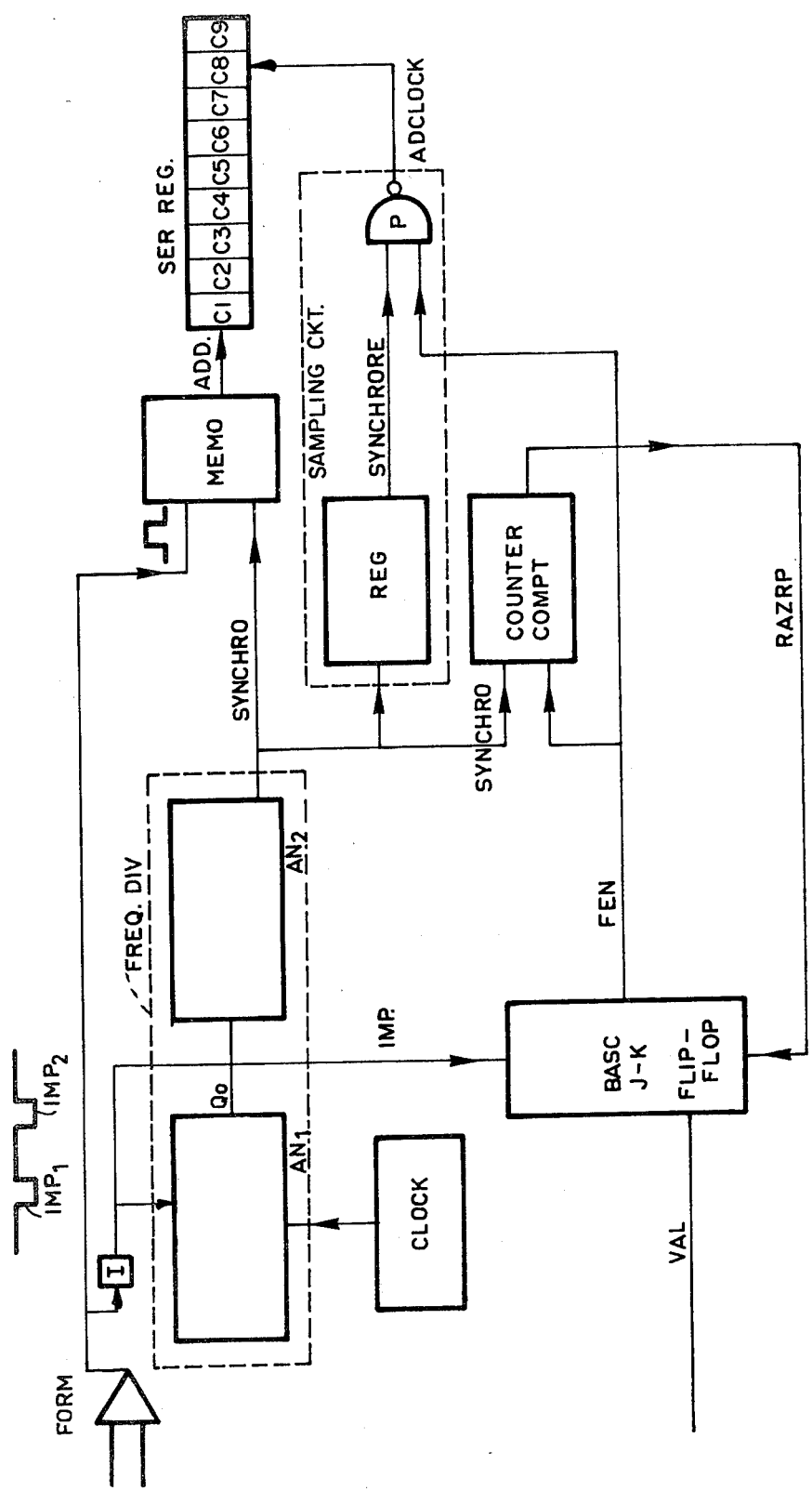
FIG. 4 is a diagram of the address-reading apparatus according to the invention.

To give a better understanding of the principles of construction and operation of the apparatus according to the invention for reading addresses on a magnetic support, it will be useful to review a few facts, which are illustrated by FIGS. 1 and 2 which show, on the other hand, a preferred manner of distributing information over the magnetic disc and, on the other hand, an example of a way of writing an address on the magnetic disc.

In FIG. 1a can be seen a magnetic disc D, which rotates in the direction of arrow F and has a useful recording area bounded by circles d1 and d2. On this disc are defined n equal sectors of a circle SO...Si...Sn. As can better be seen in FIG. 1b, each sector Si is divided into a first part SDOi and a much smaller part SADi, in which are recorded, on the one hand, the data intended for processing by the data processing system with which the disc memory is associated and, on the other hand, the address of the tracks and the information required to servo-control the position of the magnetic head T (FIG. 3a) with respect to the axes $Ax_j$ of the tracks. In FIGS. 1c and 1d, the axes of the tracks illustrated are Ax0, Ax1, Ax2, Ax3, Ax4, whereby j = 0, 1, 2, 3 and 4.

FIGS. 1c and 1d are enlarged views of that part SADi of a sector Si which is contained within the circle C.

Each SADi part of a sector Si is divided into N zones ZRPio...ZRPij...ZRPi(N−1) which are termed positioning reference zones. For the sake of simplicity only the first five zones ZRPio to ZRPi4 are shown in FIGS. 1c and 1d, these zones being represented by rectangles instead of sectors of a circle to simplify the drawing.

The boundaries between the various zones ZRPij are the circular axes $Ax_j$ of the magnetic tracks. Each magnetic track of serial number j and axis $Ax_j$ has a zone ZRPij associated with it. Thus, track 0 has zone ZRPio associated with it, track 1 has zone ZRPi1 associated with it and so on.

Each zone ZRPij contains the address of the track with which it is associated. As can be seen in FIG. 1d, zone ZRPio contains the address of track 0, zone ZRPi1 contains the address of track 1, and so on.

The addresses of the tracks are expressed in a binary code in which the number p of bits is such that $2^p > N$ wherein N = total number of tracks on each magnetic disc face.

A description of various binary codes is given for example, page 277 of Electronic and Nucleonic Dictionary, 3rd ed., 1966, McGraw-Hill, or page 517 of Digital Computer and Control Engineering, Ledley, 1960, McGraw-Hill.

As can be seen in FIG. 2, zone ZRPij comprises a plurality of equal length individual cells, equal in number to the bits needed to write the addresses of the tracks.

Each bit of the address is associated with one cell so for the zone illustrated in FIG. 2, there are cells C1 to C9, of which cell C1, C2, ...,C9 are illustrated in detail. Each bit address has one cell associated with it, cell C1 being associated with the highest order bit and cell C9 with the lowest order bit. The cells are shown in ascending numerical order from left to right, which corresponds to the (temporal) order in which they are written and read by the magnetic head T.

Each of the cells C is divided into four equal parts CP1, CP2, CP3 and CP4, having boundaries at the positions P1, P2, P3 and P4, with position P1 being the boundary between parts CP1 and CP2, and so on. Each cell contains two successive changes in the sense of magnetisation of the magnetic disc. These changes are indicated by double lines in FIG. 2 in which there are also shown for each cell, the sense and sign of the induced magnetism in each of the said parts CP1 to CP4.

Each of the two changes in sense of magnetisation is able to occupy either of two positions:
(1) the first change indicates an item of information required for servo-controlling the position of the head T and it may occupy either position P1 or position P2;
(2) the second change, also termed an "adjusting change," may occupy either position P3 or position P4 and indicates the value of the address bit; for a binary 0, the position change is at position P3 and for a binary 1 the change is at position P4.

By using two magnetization polarity changes in each cell, each individual cell is restored to a condition which is identical from one cell to the next so that the sense and sign of the induced magnetism are identical in part CP1 of each of cells C1 to C9.

In the zone illustrated in FIG. 2, the "adjusting changes" in cells C1 and C9 occupy position P3, whereby the address bits of these cells are 0's; in contrast, the "adjusting change" in cell C2 occupies position P4, whereby the corresponding bit is a 1. The first cell C1 in a zone ZRPij contains an additional change magnetization sense change MARC which enables the beginning of the zone to be found. The additional change MARC occupies position PO (see FIG. 2).

The addresses are preferably written in a reflected binary code termed a Gray code. A description of such a code appears in the two previously mentioned books.

In FIG. 3a, a schematic view of the first five cells, C1 to C5 of two adjoining reference zones ZRPi2K and ZRPi(2K-1) (shown as rectangles instead of circular sectors for convenience) is illustrated the principal characteristic of the Gray code, namely that two successive addresses are distinguished from each other by a change in only one bit. As can be seen in FIG. 3a, the addresses (2K) and (2K−1) respectively written in zones ZRPi2K and ZRPi(2K−1) differ with respect to the bit in cell C4; where the 2K address bit in cell C4 is equal to 0 (adjusting change in position P3) and the (2K−1) address bit in cell C4 is equal to 1 (adjusting change in position P4).

To simplify the explanation, it will be assumed that address (2K) is written in reference zone ZRP$i$2K which is being read; it is to be understood that the description applies equally to reading any address contained in any reference zone ZRPij on the magnetic disc D.

FIG. 3b is an illustration of the analogue signal read by the magnetic head T from the reference zones ZRP(i2K) and ZRP(2K-1), the head T straddling the axis Ax(2K-1) of the address track (2K-1). The major proportion of the head T is situated above zone ZRPi2K.

This signal can be broken down into a plurality of individual signals which are:

(1) the position servo signals SP11, SP12, SP15, SP21 to SP25, etc., (2) a signal S MARC corresponding to the magnetization sense change MARC which indicates the beginning of zones ZRPi2K and ZRPi(2K-1);

(3) signals AB1, AB2, AB3, AB5 which correspond to the various bits of address (2K), with signal AB1 corresponding to the most significant address bit. Signal AB4 contains two peaks CR1 and CR'2 which occur because the two adjusting changes in cells C4 in the two zones ZRP(i2K) and ZRPi(2K-1) are very close together. When this is the case there is a reading ambiguity in the address bit which is written in cell C4 of zone ZRPi2K. This ambiguity is resolved by an ambiguity detecting circuit (not shown) such as that which is described in a commonly assigned application Ser. No. 753,809 entitled "Apparatus and Method for Shifting a Head Movable Relative to a Carrier for Recorded Information," filed on Dec. 24, 1975.

In the present invention addresses on a magnetic recording medium are read by converting analogue signals AB1, AB2 etc into logic zero or logic one bits by measuring the interval of time separating each of the signals AB1, AB2, ABi ... AB9 etc. from the signal S MARC.

In effect, since the head T moves at a constant speed relative to the reference zones and the adjusting changes, which occupy either position P3 or P4 within each cell C1 to C9, the interval of time which separates the signal S MARC from a signal ABi varies depending on whether the signal Abi corresponds to a 0 or 1 bit.

FIG. 4 is a block diagram of the general arrangement of an apparatus for reading address on a magnetic recording medium in accordance with the method of the invention.

Figure 5:
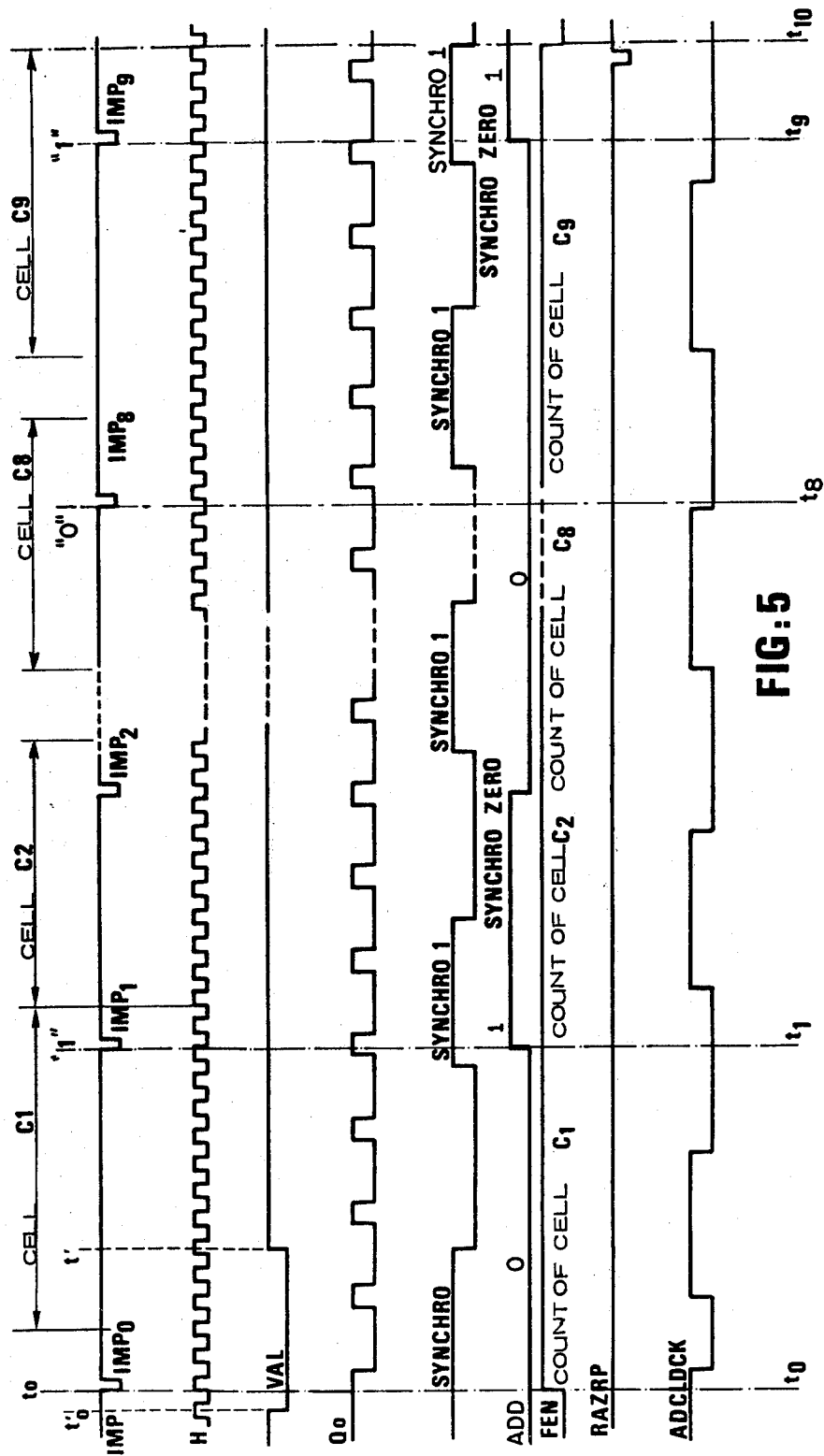
FIG. 5 is a detailed time-chart of signals taken at various points in the reading apparatus according to the invention.

The main constituent parts of the apparatus are:
(1) a circuit FORM for shaping the analogue read-out signals ABi from the magnetic head T;
(2) a clock source CLOCK;
(3) a JK flip-flop BASC;
(4) a frequency divider DIV for the output signal of clock CLOCK;
(5) a cell counter COMPT;
(6) a memory or store MEMO which stores the bits of the address; and
(7) sampling device ECHANT;

Circuit FORM, that may be a conventional threshold circuit, shapes the analogue signals S MARC, AB1, AB2, ABi ..., AB9 derived by head T into very short duration logic pulses $IMP_0$, $IMP_1$, $IMP_2$, $IMP_i$ ... $IMP_9$, as shown in FIG. 5, with the beginning of these pulses occurring at times $t_0$, $t_1$, $t_{1'}$, ..., $t_9$; and pulse $IMP_1$ corresponds to a bit equal to 1, pulse $IMP_8$ to a bit equal to zero, and pulse $IMP_9$ to a bit equal to 1.

The clock CLOCK derives a signal H which is a series of square-wave pulses having a frequency F that is extremely stable with time. The rotation of the disc is slaved to the signal from clock CLOCK. In the present embodiment of the invention, frequency F is equal to twelve times the mean frequency, Fmean, of the square-wave pulses $IMP_i$.

If the mean period of these pulses is:

$$Tmean = (t_9 - t_1/9 \times 12),$$

then $$Fmean = 8 \times 12/t_9 - t_1$$

Frequency divider DIV includes first and second respectively responsive to pulses $IMP_1$, $IMP_2$...$IMP_i$ and clock signal H.

Divider DIV derives a logic signal SYNCHRO, having a frequency one twelfth that of frequency F, i.e., equal to frequency Fmean. The period, T, of signal SYNCHRO is equal to the time taken by each cell C to pass under the reading head T. Signal H and pulses $IMP_1$, $IMP_2$, ..., $IMP_i$, ..., $IMP_9$ are combined so the SYNCHRO output of divider DIV is such that binary one address pulses (such as $IMP_1$ and $IMP_9$) are sychonised with that part of signal SYNCHRO having a temporal position associated with a logic 1 (which part is assumed to be the signal SYNCHRO 1 in FIG. 5) and in such a way that the zero address pulses (such as $IMP_2$, $IMP_8$) are synchronised with the part of the signal SYNCHRO having a temporal position associated with a logic zero (which part is assumed to be the signal SYNCHRO ZERO in FIG. 5). Therefore, SYNCHRO = SYNCHRO 1 + SYNCHRO ZERO where "+" indicates the OR logic operation.

Signal SYNCHRO and pulses $IMP_1$ ... $IMP_9$ are fed to first and second inputs of memory MEMO that combines them to derive and store binary zero and one values indicated by waveform ADD1.

When memory MEMO simultaneously receives the SYNCHRO 1 part of signal SYNCHRO and binary one address pulses, such as $IMP_1$ or $IMP_9$, it stores an address bit equal to 1. When memory MEMO simultaneously receives a SYNCHRO ZERO part of signal SYNCHRO and binary zero address pulses, such as $IMP_2$ and $IMP_8$, it stores an address bit equal to zero.

Signal SYNCHRO is fed in parallel to the input of sampling device ECHANT and resettable cell counter COMPT. Counter COMPT counts the cells in each positioning reference zone ZRPij. In the embodiment being described, counter COMPT has a counting capacity equal to the number of cells C, in each address, i.e. nine. It counts a cell as soon as signal SYNCHRO changes from logic zero to logic one (at the transition from SYNCHRO ZERO to SYNCHRO 1). When counter COMPT has counted nine cells, This signal FEN is fed to the second input of the sampling device ECHANT and to the second input of counter COMPT.

As seen in FIG. 5, sampling device ECHANT derives a signal AD CLOCK with a phase lag that is a fraction of the period T of signal SYNCHRO (a quarter of a period in the present embodiment). Signal AD CLOCK is fed to a first input of a series register SER, having a second input responsive to the ADD output of the storage member MEMO. Register SER contains the same number of stages as the number of bits in each address.

In response to the leading edge of each AD CLOCK pulse (when the signal goes from logic zero to logic one), the bit which has been stored by storage member MEMO is transferred to register SER. In other words, the state of the storage member MEMO is sampled by the signal AD CLOCK.

As soon as all of address (2K) has been stored in register SER, the address can be used as information by electronic circuits of the magnetic disc memory, such as the apparatus for controlling the displacement of magnetic heads, as described in the co-pending commonly assigned S.N. 753,809 entitled Apparatus and Method for Shifting a System.

In a preferred embodiment of the invention the sampling device ECHANT comprises, shift register REG; and NAND gate p. Register REG responds to signal SYNCHRO to derive a signal SYNCHRORE which has a delay of a quarter of a period with respect to signal SYNCHRO. Signals SYNCHRORE and FEN are combined by NAND gate P, that derives the signal AD CLOCK.

In a preferred embodiment of the invention, divider DIV is formed by a combination of two series connected, frequency dividing ring counters AN1 and AN2, with counter AN1 receiving pulses $IMP_i$ and signal H and counter AN2 deriving the signal SYNCHRO. Such counters are described in, for example, a book published by the Fairchild company entitled "T2L Applications" (August 1973), on page 10-8. If counter AN1 divides the frequency of signal H by the number n1, and counter AN2 divides the frequency of the signal QO (see FIG. 5) supplied by counter AN1 by n2, then $n1 \times n2 = 12$ (in the embodiment being described $n1 = 3$ and $n2 = 4$).

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of reading addresses on a magnetic recording medium including information items that:
   are carried by a plurality of tracks;
   are written in a binary code by means of at least one magnetic head, the addresses of the tracks being written within sets of reference zones with each track being associated with at least one zone, each set of zones containing indexing indicia to enable the beginning of the set to be found, and each zone including a plurality of individual cells equal in number to the number of bits in the address, each cell containing at least one change of magnetization sense to represent an address bit value, the change of magnetization sense for the address bit value occupying one of only two predetermined positions within the cell, the signals read by the head being shaped into logic pulses, the method comprising:
   generating a cyclic reference signal H of precise constant frequency;
   deriving a signal SYNCHRO by frequency dividing the signal H and synchronizing signal SYNCHRO with the logic pulses;
   combining the SYNCHRO signal and the pulses to derive each address bit so the value of each bit depends on the temporal position of each pulse within a period of signal SYNCHRO;
   counting the number of cells so one cell is counted each time a bit is stored;
   sampling the address bit by bit and transferring the sampled address bits to a storage member;
   enabling the address sampling and the counting of the cells during the entire period required to read each zone.

2. Apparatus for reading addresses on a magnetic recording medium including information items that:
   are carried by a plurality of tracks;
   are written in a binary code by means of at least one magnetic head, the addresses of the tracks being written within sets of reference zones with each track being associated with at least one zone, each set of zones containing indexing indicia to enable the beginning of the set to be found, and each zone including a plurality of individual cells equal in number to the number of bits in the address, each cell containing at least one change of magnetization sense to represent an address bit value, the change of magnetization sense for the address bit value occupying one of only two determined positions within the cell, the signals read by the head being shaped into logic pulses, the apparatus comprising a circuit for shaping the logic pulses, means for storing the read address; a clock for deriving a cyclic reference signal H; a frequency divider for dividing the frequency of signal H, said frequency divider deriving a signal SYNCHRO, said frequency divider being responsive to pulses derived by the shaping circuit and to the clock signal H derived by the clock; a memory for storing the address bits, said memory being responsive to pulses derived from the circuit and to the output of the divider for deriving an output that is supplied to an input of the storage means; a counter responsive to signal SYNCHRO derived from divider DIV for counting the number of cells; a sampling means responsive to the output of the divider for controlling the coupling of the output of the memory into the memory means; a flip-flop for enabling the counter and sampling means, said flip-flop having one input responsive to the output of the counter and an output for supplying a reset input to the counter and to a second input of the sampling device.

3. Apparatus according to claim 2 wherein the divider includes two series connected ring counters $AN_1$ and $AN_2$.

4. Apparatus according to claim 2 wherein the flip-flop is a JK flip-flop.

5. Apparatus according to claim 2 wherein the sampling device comprises:
   a shift register and a NAND gate, the register having an input responsive to the output of the divider and an output for driving an input gate, said gate having a second input responsive to the output of the flip-flop.

6. Apparatus according to claim 2 wherein the storage member is a series register.

7. Apparatus according to claim 2 wherein the magnetic recording medium is a magnetic disc of a magnetic disc memory.

8. Apparatus according to claim 2 wherein each set of zones comprises a single reference zone, the reference zones being arranged within separate, equal regularly spaced sectors of a circle on the surface of the magnetic recording medium, the number of zones being equal to the number of sectors.

* * * * *